United States Patent
Hou et al.

(10) Patent No.: US 8,725,278 B2
(45) Date of Patent: May 13, 2014

(54) SOUND PLAYING SYSTEM

(75) Inventors: Kun-Hong Hou, Taipei (TW); Cheng-Lin Chen, Taipei (TW); Te-Hao Liu, Keelung (TW)

(73) Assignee: Princeton Technology Corporation, HsinTien, Tapei Country (TW)

( * ) Notice: Subject to any disclaimer, the term of this patent is extended or adjusted under 35 U.S.C. 154(b) by 1366 days.

(21) Appl. No.: 12/249,581

(22) Filed: Oct. 10, 2008

(65) Prior Publication Data

US 2009/0099673 A1  Apr. 16, 2009

(30) Foreign Application Priority Data

Oct. 12, 2007 (TC) .................. 96138224 A

(51) Int. Cl.
*G06F 17/00* (2006.01)

(52) U.S. Cl.
USPC .............................. 700/94; 710/303; 710/304

(58) Field of Classification Search
USPC .......................................................... 700/94
See application file for complete search history.

(56) References Cited

U.S. PATENT DOCUMENTS

| | | | | |
|---|---|---|---|---|
| 6,148,353 A * | 11/2000 | Cho | ............................. | 710/303 |
| 6,374,148 B1 * | 4/2002 | Dharmarajan et al. | ......... | 700/94 |
| 7,188,196 B2 * | 3/2007 | Abullarade et al. | ............. | 710/22 |
| 7,899,946 B2 * | 3/2011 | Sherman et al. | ................... | 710/8 |
| 2007/0078544 A1 * | 4/2007 | Hsieh et al. | ..................... | 700/94 |
| 2008/0079604 A1 * | 4/2008 | Madonna et al. | ......... | 340/825.72 |
| 2008/0140887 A1 * | 6/2008 | Gallant et al. | ................ | 710/100 |
| 2008/0307144 A1 * | 12/2008 | Minoo | .......................... | 710/304 |
| 2009/0113095 A1 * | 4/2009 | Liu et al. | ...................... | 710/104 |
| 2009/0182924 A1 * | 7/2009 | Lydon et al. | .................. | 710/304 |
| 2010/0153607 A1 * | 6/2010 | Cheah et al. | .................. | 710/303 |

FOREIGN PATENT DOCUMENTS

| | | | |
|---|---|---|---|
| CN | 2925025 | | 7/2007 |
| WO | WO2006/047029 A1 | | 5/2006 |

\* cited by examiner

*Primary Examiner* — Paul McCord
(74) *Attorney, Agent, or Firm* — Muncy, Geissler, Olds & Lowe, P.C.

(57) ABSTRACT

A sound playing system is disclosed. The sound playing system is used for playing sound from a portable media carrier and a personal computer, including a controlling unit and a switching unit. The controlling unit includes an audio signal receiving terminal, a data transmission terminal and a signal switch terminal. The audio signal receiving terminal receives audio signals from the portable media carrier, the data transmission terminal receives data from the personal computer, and the signal switch terminal outputs a switch signal. The switching unit determines a data transmission path according to the switch signal.

6 Claims, 2 Drawing Sheets

SOUND PLAYING SYSTEM

BACKGROUND

The invention relates to a sound playing system, and in particular, to a sound playing system for playing sound from a portable media carrier and a personal computer.

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

An iPod Docking device is an amplifier, which can be connected to a portable media carrier iPod and can amplify music output from the iPod. In addition, the iPod docking device comprises a USB connector for connecting with a personal computer. Accordingly, the iPod Docking device serves as a bridge connecting an iPod and a personal computer. Music data stored in the iPod can be accessed through a personal computer. In addition, an iPod can be charged through the USB connector of the iPod Docking device.

Referring to FIG. 1, FIG. 1 illustrates a schematic view of connection among an iPod, a personal computer, and an iPod Docking device. An iPod Docking system 1 comprises an iPod 11, an iPod Docking device 12 and a personal computer 13. The iPod Docking device 12 comprises a line-in terminal 121, connecting with the iPod 11, for receiving audio signals from the iPod. The audio signals are then amplified by the amplifier 122 of the iPod Docking device 12. The iPod Docking device 12 also comprises a first USB input terminal 123, connecting with the iPod 11, implementing data transmission with the iPod 11 and charging the iPod. The first USB input terminal 123 connects with a controlling unit 124 of the iPod Docking device 12. In addition, the controlling unit 124 connects with a second USB input terminal 125. The second USB input terminal 125 connects with the personal computer 13. The controlling unit 124 controls transmission between the personal computer 13 and the iPod 11, as well as the charge function.

Conventionally, the iPod Docking device cannot switch signal inputs between the USB device and line-in terminals. Accordingly, when an iPod Docking device is not connected with an iPod, the iPod Docking device cannot playback music data from a personal computer. In this circumstance, the iPod Docking device cannot serve as an amplifier of a personal computer. This causes limitations in application.

Accordingly, an iPod Docking device serving as an amplifier of an iPod and a personal computer is needed.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An audio playing system is provided for playing sound from a portable media carrier and a personal computer. The audio playing system comprises: a controlling unit comprising an audio signal receiving terminal, a data transmission terminal, and a signal switch terminal, wherein the audio signal receiving terminal receives audio signals from the portable media carrier, the data transmission terminal receives data from the personal computer, and the signal switch terminal outputs a switch signal; a switching unit, coupled to the controlling unit, the portable media carrier and the personal computer, wherein the switching unit determines the data transmission path according to the switch signal for receiving sound signal input from the portable media carrier or the personal computer; and an amplifier, coupled to the controlling unit for playing sound specified by the audio signals.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve specific developer goals, such as compliance with system-related and business-related constraints, which may vary from one implementation to another. Moreover, it should be appreciated that such a development effort might be complex and time consuming, but would nevertheless be a routine undertaking of design, fabrication, and manufacturing for those of ordinary skill having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. The leading digit(s) of reference numbers appearing in the figures corresponds to the figure number, with the exception that the same reference number is used throughout to refer to an identical component which appears in multiple figures. It should be understood that many of the elements described and illustrated throughout the specification are functional in nature and may be embodied in one or more physical entities or may take other forms beyond those described or depicted.

Figure 1:
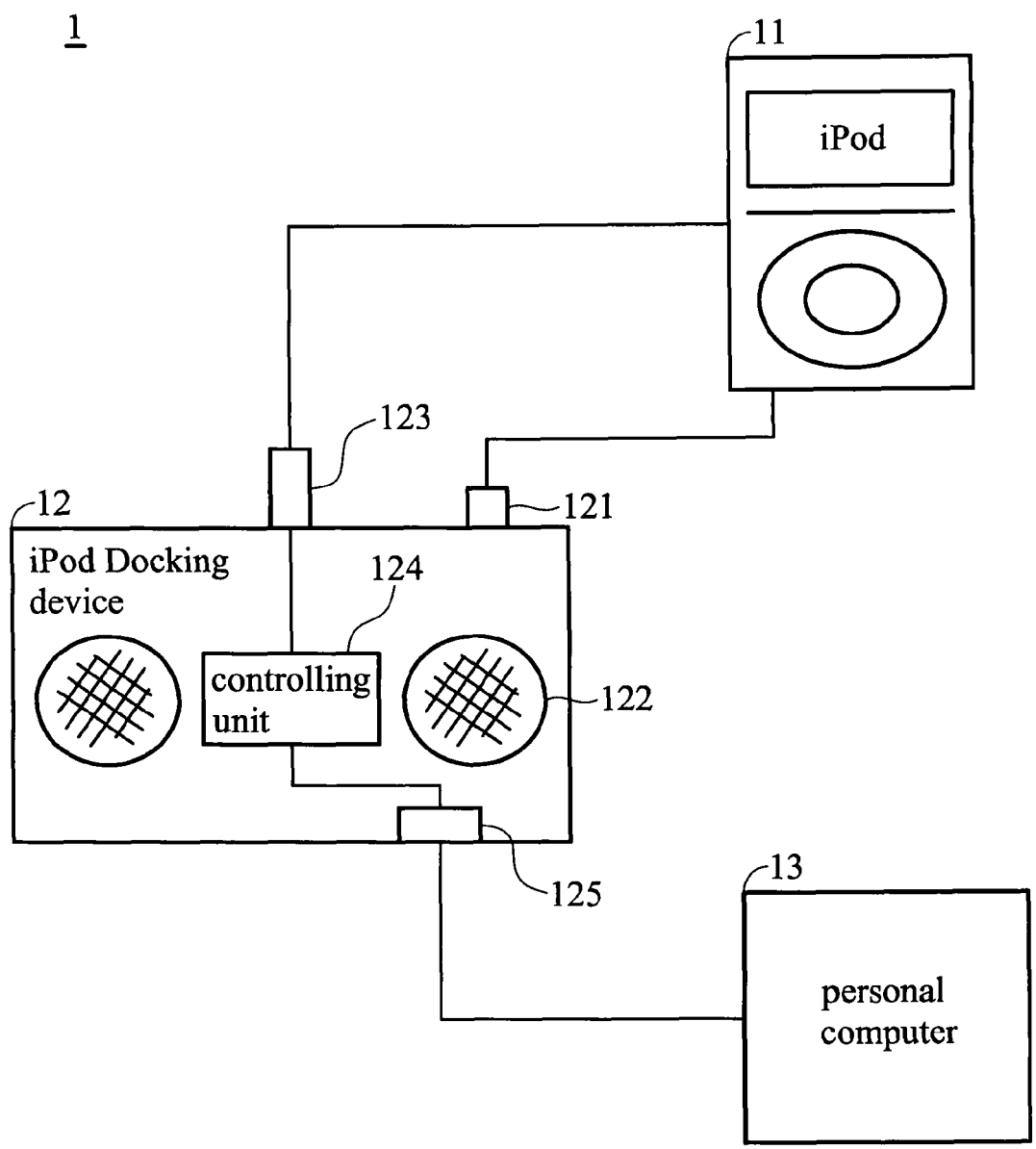
FIG. 1 illustrates a schematic view of connection among an iPod, a personal computer, and an iPod Docking device.
Figure 2:
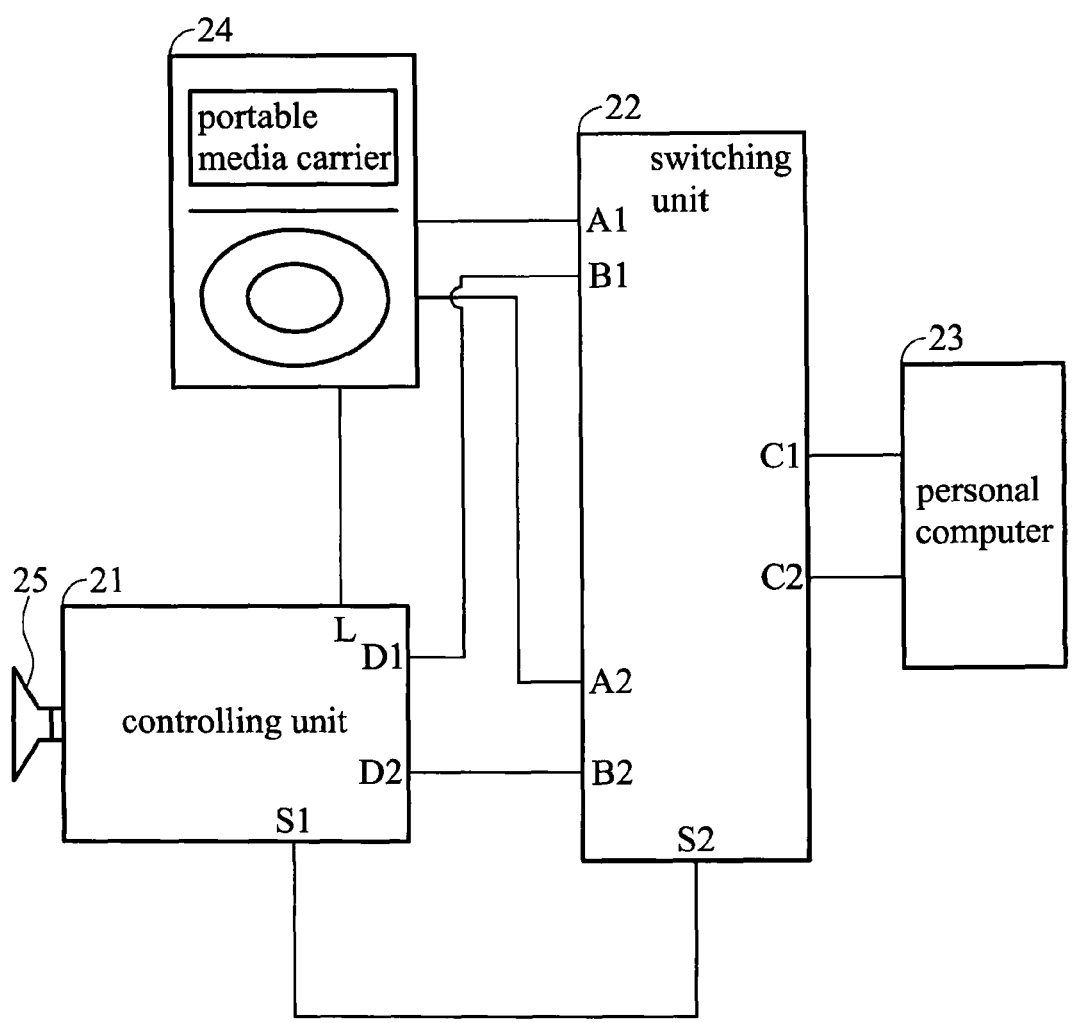
FIG. 2 illustrates a schematic view of an embodiment of an audio playing system.

Referring to FIG. 2, FIG. 2 illustrates a schematic view of an embodiment of an audio playing system. As shown in FIG. 2, an audio playing system 2 comprises a controlling unit 21, a switching unit 22, a personal computer 23, a portable media carrier 24, and an amplifier 25.

The switching unit 22 is coupled to the personal computer 23, portable media carrier 24 and controlling unit 21 through a USB device, respectively. The USB device is also implemented for data transmission and charging. The switching unit 22 comprises 4 connection terminals: portable media carrier connection terminals A1 and A2; controlling unit connection terminals B1 and B2; personal computer connection terminals C1 and C2; and switch signal receiving terminal S2.

The portable media carrier connection terminals A1 and A2 are used for connection with the portable media carrier 24, the personal computer connection terminals C1 and C2 are used for connection with the personal computer 23, and the controlling unit connection terminals B1 and B2 are used for connection with the controlling unit 21.

When the switching unit 22 is coupled to both the personal computer 23 and portable media carrier 24, data can be transmitted from the personal computer 23 to the portable media carrier 24 via the USB device, and the transmitted data can be stored in the portable media carrier 24. The portable media carrier 24 can be charged through the USB device. Here, according to the data transmission path, the data is transmitted from the personal computer 23 to the switching unit 22, and then to the portable media carrier 24. The data is not input into the controlling unit 21.

The controlling unit 21 comprises a switch signal output terminal S1, an audio signal receiving terminal L, and data transmission terminals D1 and D2 respectively connected to the controlling unit connection terminals B1 and B2 of the switching unit 22. The switch signal output terminal S1 outputs a switch signal to the switch signal receiving terminal S2 of the switching unit 22. The audio signal receiving terminal L receives audio signals from the portable media carrier 24. When sound specified by the audio signals from the portable media carrier 24 is to be played, the audio signals are transmitted from the portable media carrier 24 to the audio signal receiving terminal L of the controlling unit 21. The audio signals are then transmitted from the controlling unit 21 to the amplifier 25 coupled to the controlling unit 21. The sound specified by the audio signals is then played by the amplifier 25.

The switching unit 22 keeps transmitting data from the personal computer 23 to the portable media carrier 24. Accordingly, the portable media carrier 24 can output audio signals to the controlling unit 21 while receiving data from the personal computer 23, and can be charged via the USB device at the same time.

When the controlling unit 21 is set to play sound specified by the audio signals from the personal computer 23 rather than from the portable media carrier 24, the controlling unit 21 outputs a switch signal to the switch signal receiving terminal S2 of the switching unit 22 via the switch signal output terminal S1. Thus, allowing the data transmission path set by the switching unit 22 to be changed accordingly.

Under this circumstance, data is transmitted from the personal computer 23 to the switching unit 22 through the USB device. The transmitted data is then transferred, by the switching unit 22, from the controlling unit connection terminals B1 and B2 to the data transmission terminals D1 and D2 of the controlling unit 21. The controlling unit 21 allows the amplifier 25 to play sound specified by audio signals from the personal computer 23. Accordingly, the audio playing system plays sound specified by the audio signals from both the portable media carrier and the personal computer, thus resolving the disadvantages of the conventional iPOD docking device (i.e., unable to play sound specified by the audio signals from a personal computer).

According to this embodiment, the portable media carrier can be an iPOD. It should be noted that the invention is not limited to the described embodiment. This invention can be implemented in any portable media carrier capable of connecting with an audio playing system via an audio signal transmission mode and a data transmission mode.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio playing system for alternatively playing sound specified by audio signals provided from a portable media carrier and a personal computer, comprising:
   a controlling unit comprising an audio signal receiving terminal, a data transmission terminal, and a switch signal output terminal, wherein the audio signal receiving terminal receives audio signals directly from the portable media carrier, the data transmission terminal receives data from the personal computer through a switching unit, and the switch signal output terminal outputs a switch signal to the switching unit;
   the switching unit, coupled to the controlling unit, the portable media carrier and the personal computer, respectively, wherein the switching unit switches the data transmission path according to the switch signal for receiving sound signal input from the portable media carrier or the personal computer;
   wherein when the controlling unit is to play sound specified by audio signals provided by the portable media carrier, the controlling unit receives the audio signals directly from the portable media carrier via the audio signal receiving terminal, and caused an amplifier to play sound specified by the audio signals provided by the portable media carrier;
   wherein when the controlling unit is to play sound specified by the audio signals provided by the personal computer, the switching unit receives the audio signals from the personal computer and transfers the received audio signals to the controlling unit, and caused the amplifier to play sound specified by the audio signals provided by the personal computer; and
   the amplifier, coupled to the controlling unit for playing sound specified by the audio signal;
   wherein the audio signal receiving terminal directly receives audio signals from the portable media carrier without passing through the switching unit.

2. The audio playing system of claim 1, wherein the switching unit determines whether the data transmission path should be from the personal computer to the portable media carrier.

3. The audio playing system of claim 1, wherein the switching unit determines whether the data transmission path should be from the personal computer to the controlling unit.

4. The audio playing system of claim 1, wherein the data transmission terminal of the controlling unit is a USB transmission terminal.

5. The audio playing system of claim 1, wherein the switching unit and the controlling unit, the portable media carrier and the personal computer are coupled through a USB device, and data are transmitted therebetween through the USB device.

6. the audio playing system of claim 1, wherein the portable media carrier is a digital audio player.

* * * * *